(12) United States Patent
Datta

(10) Patent No.: US 12,471,561 B2
(45) Date of Patent: Nov. 18, 2025

(54) SEMI PORTABLE, AUTOMATED, ENCLOSED TOILET SYSTEM FOR PET ANIMALS AND METHOD THEREOF

(71) Applicant: Sandip Datta, Mumbai (IN)

(72) Inventor: Sandip Datta, Mumbai (IN)

( * ) Notice: Subject to any disclaimer, the term of this patent is extended or adjusted under 35 U.S.C. 154(b) by 0 days.

(21) Appl. No.: 18/704,899

(22) PCT Filed: Oct. 28, 2022

(86) PCT No.: PCT/IN2022/050953
§ 371 (c)(1),
(2) Date: Apr. 25, 2024

(87) PCT Pub. No.: WO2023/073735
PCT Pub. Date: May 4, 2023

(65) Prior Publication Data
US 2024/0423157 A1    Dec. 26, 2024

(30) Foreign Application Priority Data
Oct. 29, 2021    (IN) .............................. 202121049773

(51) Int. Cl.
*A01K 1/01*    (2006.01)
(52) U.S. Cl.
CPC .................................... *A01K 1/011* (2013.01)
(58) Field of Classification Search
CPC ...................................................... A01K 1/011
See application file for complete search history.

(56) References Cited

U.S. PATENT DOCUMENTS 4,050,414 A * 9/1977 Knochel .............. A01K 1/0117
119/164

FOREIGN PATENT DOCUMENTS

| CN | 111418499 A | * | 7/2020 | |
|---|---|---|---|---|
| DE | 202004020111 U1 | * | 3/2005 | ............. A01K 1/011 |
| EP | 2756146 B1 | * | 4/2017 | ............... E06B 7/32 |
| KR | 20110135527 A | * | 12/2011 | |
| KR | 102149127 B1 | * | 8/2020 | |
| WO | WO-0000018 A1 | * | 1/2000 | ............. A01K 1/011 |

OTHER PUBLICATIONS

KR20110135527A Translation (Year: 2011).*
CN-111418499-A Translation (Year: 2020).*
KR102149127B1 Translation (Year: 2020).*
DE-202004020111-U1 Translation (Year: 2005).*

* cited by examiner

*Primary Examiner* — Kimberly S Berona
*Assistant Examiner* — Steven J Shur

(57) ABSTRACT

The present invention provides a toilet system which any pet animal can use on its own without need for any human intervention. The system through the sensors (12, 15) enables the pet to open the door (14), then lock the door behind it, further use the toilet by defecating on a swiveling platform, then un-lock the door and leave the toilet without leaving any mess behind. The cleaning method of the system involves cleaning of the platform (16) by means of a control box (21) operably connected to the sensors (12, 15) and the platform wherein the platform (16) swivels by 180° to an upside-down position which dumps all the waste/debris that is to be flushed out; A sprinkler water spray (18) sprays water on all the walls and the platform during the cleaning stage for a predetermined time. The platform (16) swivels to an upright position after the cleaning is done.

18 Claims, 5 Drawing Sheets

SEMI PORTABLE, AUTOMATED, ENCLOSED TOILET SYSTEM FOR PET ANIMALS AND METHOD THEREOF

CROSS-REFERENCE TO RELATED PATENT APPLICATION

The embodiments herein claim the priority of Indian patent application Ser. No. 202121049773 filed on Oct. 29, 2021.

FIELD OF INVENTION

The present invention relates to the field of pet toilets. More specifically the present invention relates to an automatic, semi-portable, enclosed pet toilet system and method of cleaning without human intervention.

BACKGROUND OF THE INVENTION

Pets have become an integral part of many households across the world. Many houses are designed to accommodate pets. However, tackling hygiene and cleanliness issues at homes with pet animals running around have become challenging. It is further challenging to entertain pets in apartments where there are no backyards for the pets to defecate. To address these issues many indoor pet toilets have been designed. The pet toilets are aimed at minimizing the mess created by pets at homes due to the lack of open spaces. The conventional pet toilets had litter boxes, which were then replaced by basins that needs to be regularly cleaned by the owners after the pet uses them. These methods however had many drawbacks. One such main issue is the presence of a permanent stench in the air caused due to the pets' excretion when not cleaned immediately. This also brought out many sanitation issues, especially within small, enclosed houses and houses with children.

Further improvements were made to the pet toilets and certain solutions such as indoor faux grass was introduced where the faux grass resembled the natural grass, and the pets were encouraged to use them for excretion. Also, grated pet toilets came into use where the pets excreted on a tray fitted with a grate. But these improvements did not help in eliminating the odor constantly present indoors. It only resulted in usage of lot of cleaning agents which proved to be time consuming and not environment friendly.

The need for better excretion system for pets increased and pet toilets with flush mechanism were introduced similar to the regular toilet systems at homes. The pet toilets again needed human's intervention for flushing and cleaning of the toilets. There are some pet toilets in the market with auto cleaning system, but they are very difficult to move around as they must be fixed in a place due to its size and complex operational methods. Further in the presence of more than one pet animal at home, it becomes difficult to restrict the usage of the toilet to one pet at a time and it becomes chaotic inside the toilet when two pets try to use it at the same time. Further, it puts the safety of the pets at risk when the enclosed toilet system closes after the pet animal when the toilet is in use, as the owner wouldn't be aware of what is happening in the pet toilet. However, many existing pet toilets' systems have been designed to address the needs of the pet animals to defecate in a friendly environment which are provided with easy cleaning methods.

South Korean patent application KR20110135527A relates to an automatic pet flush toilet, the sensor 520 of the upper frame 300 detects the entry and exit of the dog, the control device 500 is operated to automatically water the water of the dog's feces in the plumbing facility 400 By discharging urine to the drain immediately by spraying, it prevents the smell of stool, solves the difficulty of cleaning every time, prevents the unsanitary environment caused by the feces of dogs, and reduces the water consumption used to treat the feces. It minimizes the use of various cleaning agents and eliminates excessive consumption such as pulp material pads and toilet paper.

US patent application U.S. Pat. No. 8,863,693B2 animal toilet disclosed herein is equipped with a permeable toileting surface, a catchment surface underlying the toileting surface to collect and channel liquids, and a drain. The toileting surface may be equipped with a rinsing element to rinse wastes from the toileting and catchment surfaces. The drain may be further equipped with tubing to convey the liquids to a convenient disposal location. The animal toilet may be equipped with a moving toileting surface, which results in improved rinsing, and potential solid waste collection. In all embodiments, absorbent material may be used in place of permeable material for the toileting surface, which may not require any rinsing. The solid waste disposal may be automated through the use of rinse water and disposal tubing routed to the proper disposal location.

US patent application U.S. Pat. No. 6,457,435B1 discloses a pet toilet for use indoors. The pet toilet has electronic sensing detection devices built within its parallel walls of housing. Such electronic sensing detection devices determine the pet's entrance and leaving. Once the pet leaves the housing, the system flushes. The pet toilet is attached to conventional household drains. The water is supplied by a water supply line and feeds such water through water distribution lines which are embedded in the parallel walls of the housing. The invention also encompasses a manual flush button in case the pet owner wishes to flush the system manually, and also the housing comprises a water spray assembly to effectively clean the housing with a hand-held spray device.

US patent application U.S. Pat. No. 3,603,290 discloses a pet is trained to excrete upon a tray and to reinforce the training, the pet is given a reward for excreting, such as food from a dispenser operated by the pet. To prevent the pet from cheating, a urine sensor and a feces sensor are located on the tray and an interlock circuit connects them to the dispenser, preventing operation of the dispenser unless at least one of the sensors detects the presence of excrement. To reduce odors, a flushing flow of water may be provided and the human toilet bowl is utilized to receive the animal excrement and the flushing flow. Since water flow is available to the tray, the sensors may be water powered, and the interlock circuit may be water powered.

US patent application U.S. Pat. No. 4,729,342 discloses an automatic pet toilet has a housing defining a generally closed chamber having a floor and side walls, one of the latter having an opening through which the pet can pass. A door is displaceable on the housing between a closed position blocking the opening and an open position clear of same by means of a door drive motor. A closed-door switch on the housing generates an output only when the door is in its closed position. Floor and wall sprays respectively directed in the chamber at the floor and walls of the chamber are supplied with wash liquid, usually water, by a valve connectable to a source of pressurized liquid. A drain in the floor and a chopper connectable to a waste line receive material washed by the sprays from the walls and floor, comminute the material, and feed it to the waste line. A sensor emits an output when the pet is within the chamber and a controller connected to the chopper, switch, sensor, motor, and valve closes the door and then opens the valve and operates the chopper when a pet has entered and left the chamber with interruption of the beam while in the chamber, and thereafter closes the valve, stops the chopper, and opens the door.

Another US patent application U.S. Pat. No. 6,561,131 discloses a pet toilet preferably includes a litter chamber with a sculptured end and a tapered end. A mechanism preferably moves the litter chamber to a vertical position to meet a stationary vertical lid for cleaning. When the lid and the litter chamber are together, an airtight seal is created. The sculptured end is at the top of the litter chamber and the tapered end is at the bottom of the litter chamber when the litter chamber is in a vertical position. A blade, found at the lowest point of the tapered end, cuts and agitates the waste collected by gravity at this lowest point. Water, added to the vertical litter chamber through an inlet and holes around the blade, floats the waste to the top of the litter chamber. The sculptured end catches floating waste and directs it out of the pet toilet through an exit pipe.

Although all of the prior-arts are effective in their intended purposes, the existing devices and systems do not provide an economical, easy and smooth level of operation, wherein in the presence of multiple pet animals, the usage of the toilet system proves to be complicated. Further the prior art does not provide portability of the toilet system in the existing designs. In places with tropical weather, the pet animals will be let out often in the open spaces of the houses and having multiple pet toilet systems (such as indoor and outdoor systems separately) is not feasible. Further the enclosed designs of the prior art poses a risk for the pet animals as they may face some problems in the toilet and the owner may not be aware of the situation. Hence, there exists a need to solve these problems found in the prior art. The present invention addresses these needs by providing a transparent pet toilet system that is portable i.e. it can be used both outdoors and indoors and is also weather-friendly. The present invention also provides an efficient self-cleaning system with a rotating platform of the toilet system.

The present invention provides the pet animal the freedom of using the toilet system as many times as it needs and whenever it feels the need to do so without having to wait for its human companion to help and take it out for defecating purposes.

Objects of the Invention

The main object of the present invention is to provide a pet toilet system for pet animals with self-cleaning feature wherein the floor or the platform of the toilet system swivels for efficient dumping of the waste and cleaning purposes.

The primary object of the present invention is to provide a pet toilet system which allows only one pet animal to enter and use the system at any given time in case of presence of multiple pet animals.

It is another object of the present invention to provide a pet toilet system with sensors for unlocking and locking the door of the system.

It is another object of the present invention to provide a pet toilet system with self-locking door enabled by the sensors.

It is another object of the present invention to provide a pet toilet system with a housing that is transparent on the top part which enables the owner to manually intervene or carry out pet potty training.

It is another object of the present invention to provide a pet toilet system with portable mechanism, wherein the toilet system can be used both indoors and outdoors and is weather-friendly.

It is another object of the present invention to provide a pet toilet system with a removable door on top of the enclosure of the system for human intervention when needed.

It is another object of the present invention to provide a pet toilet system with multiple sensors that senses the entry and exit of the pet animal to safely open and lock the doors of the system.

It is another object of the present invention to provide a pet toilet system with locking feature for the safety of the pet animal and to prevent the entry of a pet animal when the cleaning of the system is in progress.

It is another object of the present invention to provide a pet toilet cleaning method wherein the platform of the toilet system swivels 180° and the water spray is activated to spray water on the platform and walls for a predetermined time for cleaning purposes.

It is another object of the present invention to provide a pet toilet system without human intervention.

Unlike existing pet toilet systems, the present invention provides a toilet system which ensures single occupancy at any given time and the usage and cleaning of the system does not require any human intervention. This system is applicable to any kind of pet animal.

SUMMARY OF THE INVENTION

The present invention provides a semi portable, automated, enclosed toilet system for pet animals without human intervention, comprising of an outer sensor operably connected to a lock of a front flip door wherein the outer sensor senses the approach of a pet animal and energizes and deactivates the lock of the flip door to open when a pet animal enters the system. The present invention also comprises of an inner sensor which is operably connected to the lock of the flip door, wherein the inner sensor senses the entry of the pet animal through the front door and energizes and activates the lock of the flip door and a swiveling platform that is used by the pet animal to defecate, wherein the platform houses a motor. At least one sprinkler line/spray is provided to spray water wherein the sprinkler line is operably connected to the in-built water tank or a water inlet pipe. A control box is fitted under a ramp wherein the control box is operably connected to the sensors, motor of the swiveling platform of the system. An upper chamber of the system houses the sensors, the front door, the swiveling platform of the system, sprinkler spray and an inlet pipe that provides water supply. A lower chamber of the system houses a sewage tank provided with a sewage line/pipe of the system, wherein the sewage line/pipe runs on all four sides of the chamber. The system is housed in an enclosure, wherein the upper parts of the enclosure are transparent. The system can be used outdoors even during winter, wherein the enclosure of the system is provided with an over-head water tank with an embedded heater to keep the water warm. The toilet system is further provided with a pipeline/inlet pipe through which the heated water runs all around the housing in circles which in turn serves as heating coils to keep the entire enclosure of the toilet system warm when outdoors. The pipeline is fitted with a pump/turbine (30) to keep the water flowing throughout. The pipeline is fitted with a thermostat (28) on the return line just before the water re-enters the tank. The thermostat (28) senses the water temperature running through the pipeline and activates the heater (32) in the water tank (26) if the temperature of the water is below the predetermined value.

The system comprises of a pet animal which enters and uses the toilet system without human intervention. The pet animal enters the toilet system using ramp/steps. The outer sensor senses the approach of the pet animal and deactivates the lock of the front door to enable the opening of the door wherein the pet animal flips the front door and enters the system. The inner sensor senses the entry of the pet animal and activates the lock of the front door. The pet animal uses the swiveling platform to defecate and exits the platform. The inner sensor senses the exit of the pet animal and deactivates the lock of the front door and as the pet animal exits out of the door, the outer door senses the exit of the pet animal through the front door and activates the lock of the front door.

In the preferred embodiment of the present invention, the method of cleaning of the pet toilet system comprises a pet animal entering the system and using the platform to defecate and exiting the system. Further, the system is locked through the outdoor sensor which activates the lock of the flip door once the pet animal exits, wherein the outer sensor senses the exit of the pet animal. Once the front door is locked, the cleaning of the system begins. The platform swivels by 180° in the upper chamber to an upside-down position which dumps all the waste/debris that is to be flushed out, by means of a control box operably connected to the sensors and the platform. The sprinkler water spray is activated which sprays water on all the walls and the platform/stage, wherein the sprinkler spray is connected to the inlet pipe or water tank, wherein the spraying of water stops after a predetermined time. Once the cleaning is done, the platform is further swiveled by 180° to an upright position. The waste is collected in the sewage tank and is disposed through the sewage exit line/pipe connected to relevant exit pipelines.

Other features and advantages of embodiments will be apparent from the accompanying drawings and from the detailed description that follows.

Figure 1:
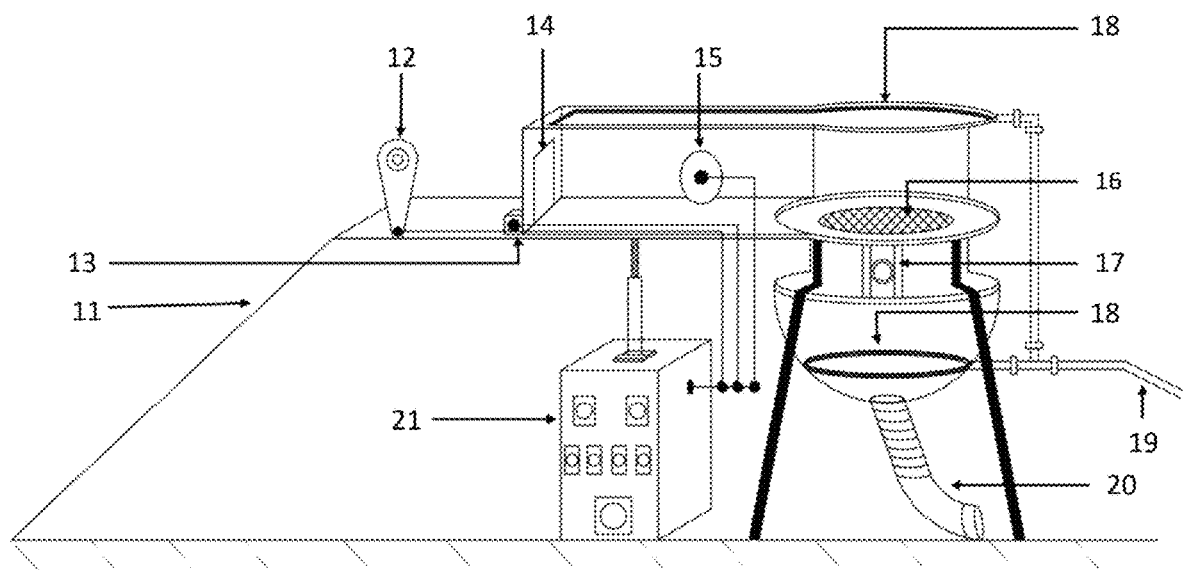
FIG. 1 illustrates the pet toilet system and its various components in accordance with the present invention.
Figure 2:
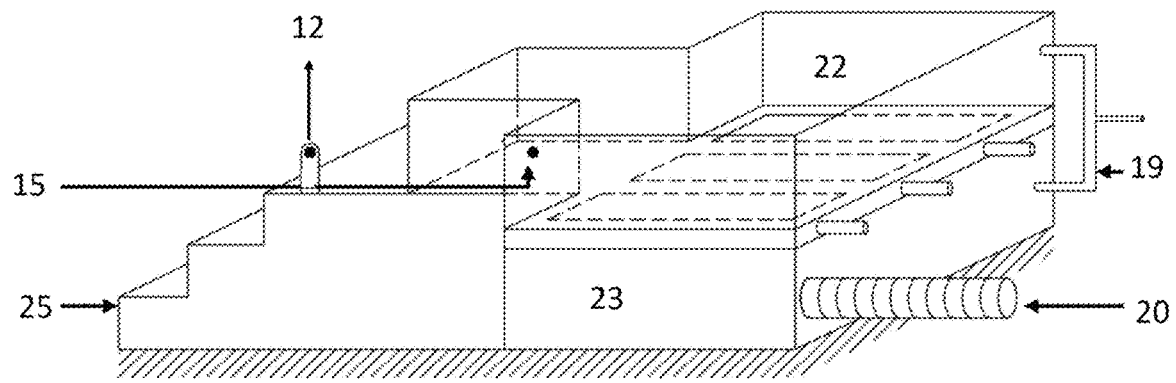
FIG. 2 illustrates the pet toilet system with a swiveling platform (fitted inside the system) in accordance with the present invention.
Figure 3:
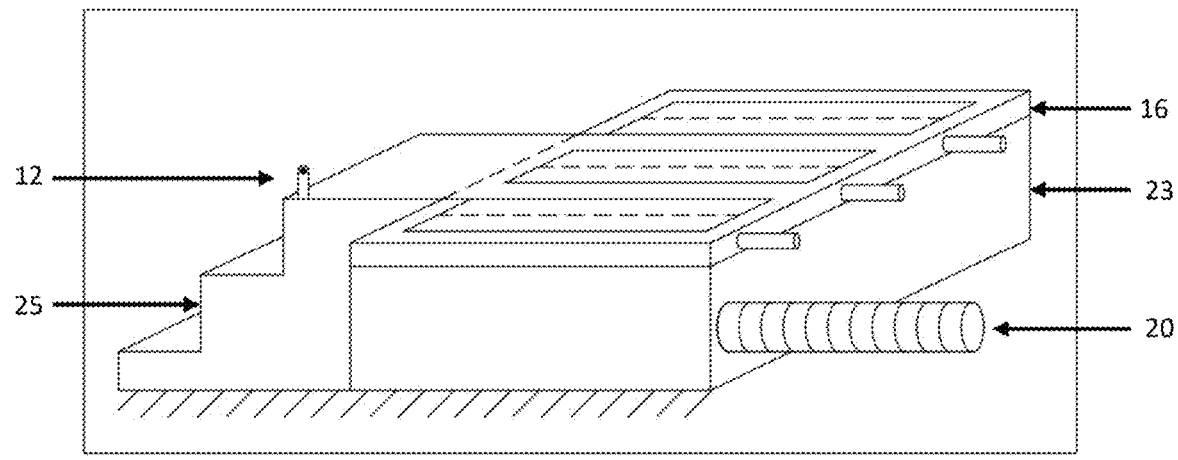
FIG. 3 illustrates the platform and bottom section of the pet toilet system with the control box provided under the steps/ramp (in-case steps are replaced by ramp) in accordance with the present invention.
Figure 4:
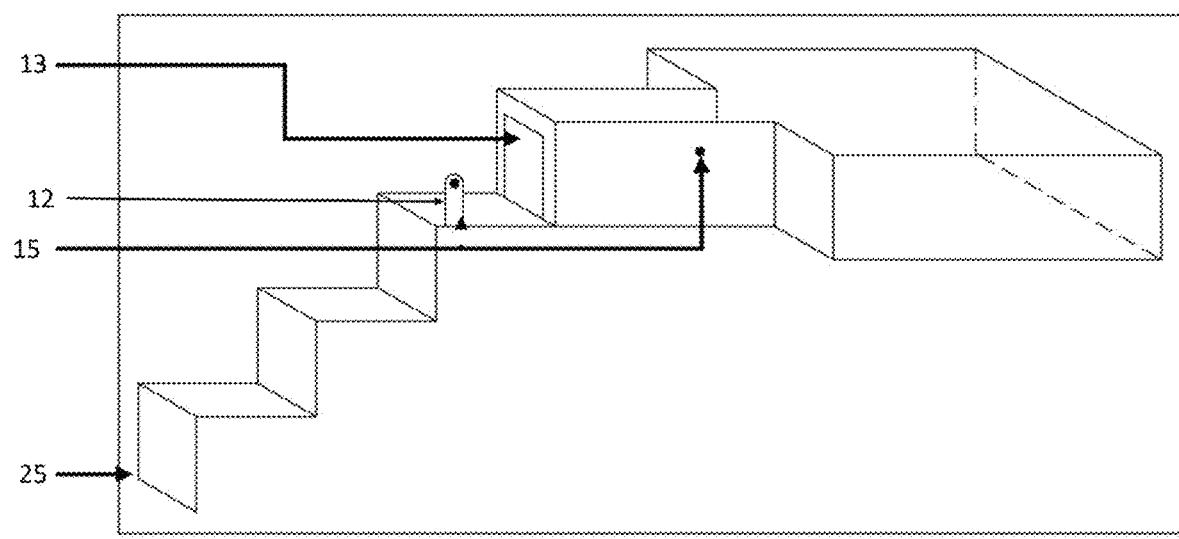
FIG. 4 illustrates the top section of the pet toilet system with entry/exit steps/ramp, front flip door and sensors in accordance with the present invention.

The part names and reference numerals of the drawings in accordance with the present invention are given below.

| Part name | Part number |
|---|---|
| Ramp | 11 |
| Outer sensor | 12 |
| Lock | 13 |
| Front door | 14 |
| Inner sensor | 15 |
| Swiveling platform | 16 |
| Multiple sections | 16a, 16b, 16c |
| Swiveling motor | 17 |
| Sprinkler line/spray | 18 |
| Inlet pipe | 19 |
| Outlet/Sewage pipe | 20 |
| Control box | 21 |
| Upper chamber | 22 |
| Lower chamber | 23 |
| Spindle | 24 |
| Steps | 25 |
| Water tank | 26 |
| Float Valve | 27 |
| Thermostat | 28 |
| Water pipeline or inlet pipe around the enclosure for heating | 29 |
| Pump/ turbine | 30 |
| Sewage tank | 31 |
| Heater | 32 |

While the invention is amenable to various modifications and alternative forms, specifics thereof have been shown by way of example in the drawings and will be described in detail. It should be understood, however, that the intention is not to limit the invention to the embodiments described. On the contrary, the intention is to cover all modifications, equivalents, and alternatives falling within the scope of the invention.

Hereinafter, preferred embodiments of the present invention will be described in detail with reference to the accompanying drawings. Prior to this, terms and words used in the present specification and claims should not be construed as limited to ordinary or dictionary terms, and the inventor should appropriately interpret the concept of the term appropriately to describe its own invention in the best way. The present invention should be construed as meaning and concept consistent with the technical idea of the present invention based on the principle that it can be defined. Therefore, the embodiments described in this specification and the configurations shown in the drawings are only the most preferred embodiments of the present invention and do not represent all the technical ideas of the present invention. Therefore, it should be understood that equivalents and modifications are possible.

DETAILED DESCRIPTION OF THE INVENTION WITH RESPECT TO THE DRAWINGS

The present invention as embodied by "A semi portable, automated, enclosed toilet system for pet animals and method thereof" succinctly fulfils the above-mentioned need(s) in the art. The present invention has objective(s) arising as a result of the above-mentioned need(s), said objective(s) being enumerated below. In as much as the objective(s) of the present invention are enumerated, it will be obvious to a person skilled in the art that, the enumerated objective(s) are not exhaustive of the present invention in its entirety and are enclosed solely for the purpose of illustration. Further, the present invention encloses within its scope and purview, any structural alternative(s) and/or any functional equivalent(s) even though, such structural alternative(s) and/or any functional equivalent(s) are not mentioned explicitly herein or elsewhere, in the present disclosure. The present invention therefore encompasses also, any improvisation(s)/modification(s) applied to the structural alternative(s)/functional alternative(s) within its scope and purview. The present invention may be embodied in other specific form(s) without departing from the essential attributes thereof.

Throughout this specification, the use of the word "comprise" and variations such as "comprises" and "comprising" may imply the inclusion of an element or elements not specifically recited. Throughout this specification the term "pet" is used interchangeably with "pet animal".

The present invention provides a versatile, semi-portable, automatic pet toilet system and method of cleaning without the need for any human intervention.

The present invention provides a toilet system which any pet animal can use on its own without need for any human intervention. The present invention enables the pet to open the door, then lock the door behind it, further use the toilet, and then un-lock the door and leave the toilet without any human intervention. The toilet system also self-cleans after the pet defecates and exits the system.

As seen in FIGS. 1 to 6, the pet toilet system disclosed by the present invention comprises of an upper chamber (22) and lower chamber (23). The upper chamber (22) comprises of an outer sensor (12) which is placed at the entrance of the system and is operably connected to the front door (14). As the pet enters the toilet, the outer sensor (12) senses it and sends a signal to the front door (14) which gets deactivated and the door (14) is unlocked for the pet animal to enter it. The front door (14) is a flip door that is hinged on the top, making it easy for the pet to enter. The lock (13) to the front door (14) is energized and deactivated by the outer sensor (12) which enables the front door (14) to open for the pet animal. The system further comprises of an inner sensor (15) behind the front door (14) which senses the entry of the pet animal that opens the flip door (14) and enters the system. Once the pet animal approaches the toilet, the inner sensor (15) (the second sensor) sends a signal to the lock (13) and activates it which locks the front door (14) thereby efficiently preventing the entry of another pet animal, while the toilet is already in use. This feature ensures single occupancy of the toilet system at any given time. The toilet system further comprises of a platform (16) or stage that swivels and is used by the pet animal for excretion purposes.

Once the pet animal defecates and exits the platform (16), the inner sensor (15) sensing the return of the pet, energizes and deactivates the lock (13) to unlock the front door (14). The pet animal flips the door (14) and exits and the outer sensor (12) senses the exit of the pet animal and activates the lock (13) of the front door (14), which is subsequently locked.

The upper chamber (22) is also provided with a cleaning/inlet pipe (19) that provides water for cleaning the platform (16) and the system. The lower part (23) of the chamber comprises of a sewage tank (31) fitted with a sewage exit pipe (20) which expels the wastes and debris removed due to the cleaning process from the toilet system. The cleaning and flush water supply through inlet pipe (19) is connected to at least one pump (30) for water supply or supply from a reservoir that can be emptied into a water holding tank (26). The water pump increases water pressure, thus enabling the water to flow at a faster rate through plumbing pipes constantly. Further, the sewage exit pipe (20) is directly connected to the relevant pipelines to expel the waste. The pet toilet system is housed in an enclosure wherein the upper parts of the walls are made of transparent material enabling visibility for both pets and owners, thereby reducing anxiety of both. The top part of the enclosure of the toilet system is open to facilitate the training of the pet when needed. The top part of the system that is open enables the owner to observe the pet and also helps in easy removal of the pet by the owner in case of emergencies.

In the preferred embodiment of the present invention, the pet toilet system may contain an in-built fresh water supply tank/holding tank (26) connected to the inlet pipe (19) and the sewage storage tank connected to an outlet or sewage line/pipe (20).

In the preferred embodiment of the present invention, the toilet system further comprises of at least a sprinkler line (18) to spray the water for cleaning purposes which is connected to the inlet pipe (19). The system is also provided with an outlet/sewage pipe (20) fitted with a water lock.

In preferred embodiment of the present invention, the sewage line/pipe (20) in the lower chamber (23) runs on all four sides of the chamber (sewage lines only on two sides are shown in the FIG. 1).

Figure 5:
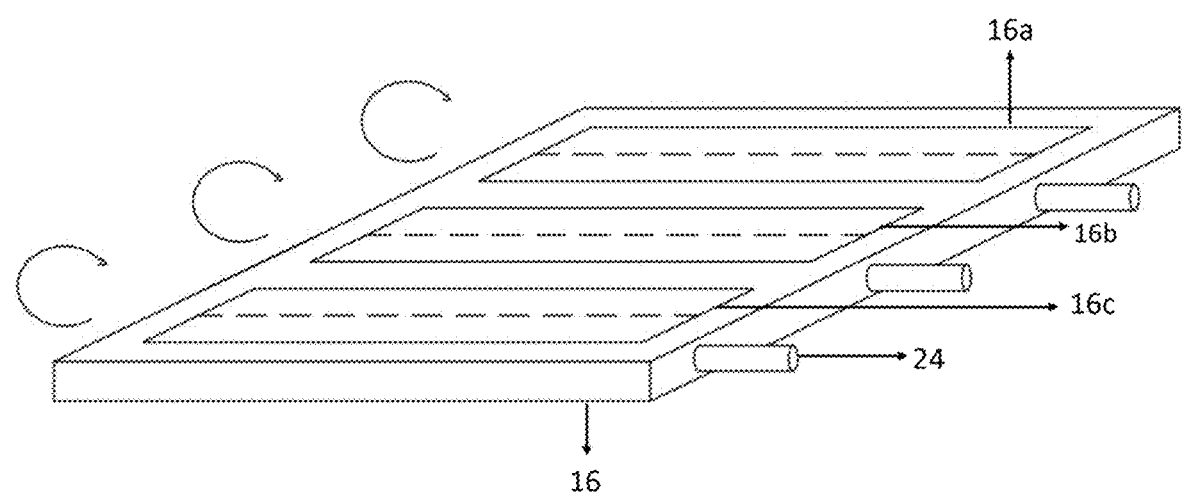
FIG. 5 illustrates the entire platform of the pet toilet system comprising of multiple sections in accordance with the present invention.
Figure 6:
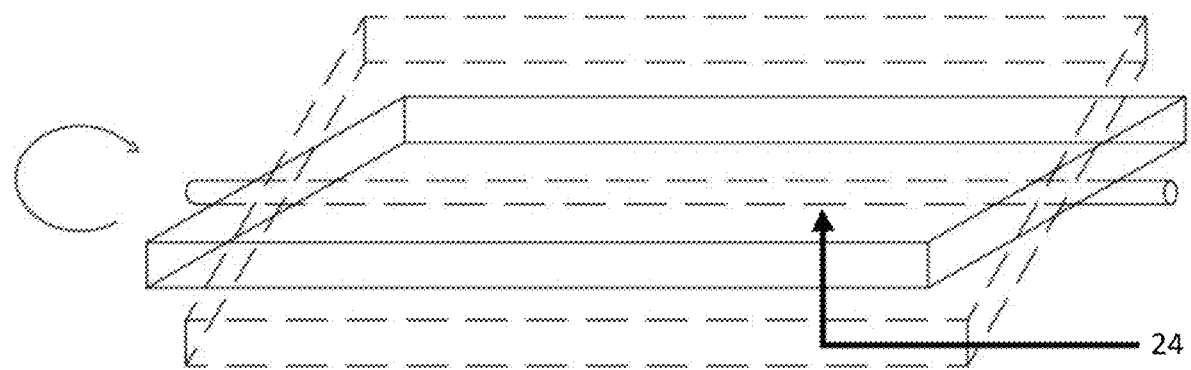
FIG. 6 illustrates one section of multi-sectional platform of the pet toilet system comprising of multiple sections with rotating spindle in accordance with the present invention.

In the preferred embodiment of the present invention, the toilet system further comprises of a platform (16) or stage that swivels 180° (upside down) for cleaning purposes. Once the cleaning of the platform (16) is completed, the platform (16) swings another 180° (upright position) to its normal position and ready to be used by the pet animal. The swiveling platform (16) is provided with a swiveling motor (17) that ensures the functioning and rotation of the platform (16). The platform further comprises of multiple sections (16a, 16b, 16c) and the rotation of the platform (16) is facilitated by means of at least a spindle (24) which provides the axis of rotation for the platform (16), as seen in FIGS. 5 and 6. The multiple sections (16a, 16b, 16c) of the platform (16) enables the height adjustment of the platform to suit the pet animal's needs.

In the preferred embodiment of the present invention, the toilet system comprises of a ramp (11) for the pet animal to walk on and enter/exit the toilet system.

In the preferred embodiment of the present invention, the toilet system is provided with a control box (21) under the ramp (11), that comprises of a programmable logic controller that activates and controls the sensors (12, 15), pumps (30), sprinkler sprays (18) etc. and enables the functioning of the system by activating the swiveling motor (17) to rotate the platform (16) for cleaning purposes.

Figure 7:
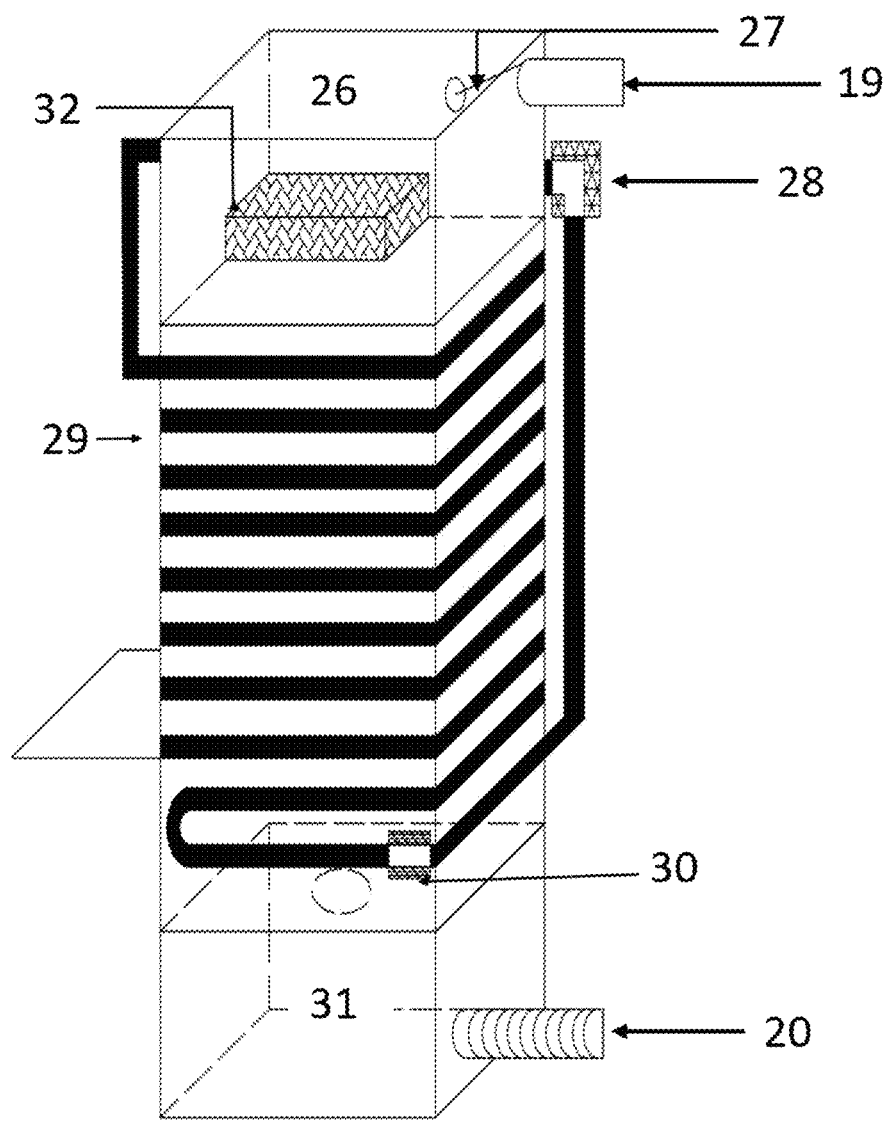
FIG. 7 illustrates the enclosure of the pet toilet system used outdoors comprising of water tank with embedded heater and pipeline/inlet pipe in accordance with the present invention.

In the preferred embodiment of the present invention, the pet toilet system can also be used outdoors irrespective of the weather changes, wherein the system is provided with an enclosure with an over-head water tank (26) with an embedded heater (32) to keep the water warm, as seen in FIG. 7. The toilet system is further provided with a pipeline (29) through which the heated water runs all around the housing of the enclosure in circles which in turn serves as heating coils to keep the entire enclosure of the toilet system warm when outdoors. The pipeline (29) is further fitted with at least a pump/turbine (30) to keep the water flowing throughout. The pipeline (29) is fitted with a thermostat (28) on the return line just before the water re-enters the tank (26). The thermostat (28) senses the water temperature running through the pipeline (26) and activates the heater (32) in the water tank (26) if the temperature of the water is below the predetermined value. Further, the water used for circulation is also used to clean and flush the toilet.

The primary purpose of the water tank (26) is to store water that can be used for cleaning purposes, wherein the water tank is further fitted with an inlet pipe (19) and a float valve (27) to automatically keep the tank (26) full and prevent overflow of the water from the tank (26). The enclosure is also fitted with a sewage tank (31) at the bottom along of the system along with the outlet/sewage line (20). The over-head water tank (26) also serves to provide insulation to the system from above during winter.

In another embodiment of the present invention, the top part of the enclosure of the system may be removably attached to the system.

In another embodiment of the present invention, the number of the sensors and the position of the sensors are customized according to the need and the usage of the system. Different types of sensors including but not limited to temperature sensor, proximity sensor, light sensor, pressure sensor, smoke sensor can used according to the need of the pet toilet system.

In another embodiment of the present invention, the duration of the sprinkler (18) spraying water can be customized according to the need of the household based on the number of pet animals and usage of the system.

In another embodiment of the present invention, the toilet system comprises of steps (25) for the pet to enter/exit the toilet system.

In another embodiment of the present invention, the size of the toilet system can be customized to fit various needs of the pet animals.

In another embodiment of the present invention, the pet toilet system is provided with a CCTV (closed-circuit television) surveillance feature for monitoring the activities of the pet inside the system and the functioning of the toilet system.

In another embodiment of the present invention, the pet toilet system is provided with a separate mixer and reservoir fitment option for the addition of dis-infectant to keep the toilet system clean and hygiene.

In another embodiment of the present invention, the pet toilet system is provided with a sliding entry/exit door.

In another embodiment of the present invention, the pet toilet system is rectangular in shape to save space especially indoors.

In another embodiment of the present invention, the pet toilet system is provided with an identification mechanism such as RFID reader that identifies and controls the entry of the pet animal which also is provided with the compatible RFID tag on its collar.

In an embodiment of the present invention, a method of cleaning the semi-portable, automated, enclosed pet toilet system with upper and lower chambers, comprising the steps of:

A pet animal entering and using the toilet system and exiting the system;

Locking the pet toilet system through the outdoor sensor (12) which activates the lock (13) of the front door (14) once the pet animal exits, wherein the outdoor sensor (12) senses the exit of the pet animal;

Swiveling the platform/stage (16) in the upper chamber (22) to an upside-down position by 180° by means of the control box (21) operably connected to the sensors (12, 15) and the swiveling motor (17) of the platform (16) which dumps all the waste/debris that is to be flushed out;

Activating the sprinkler water spray (18) which sprays water on all the walls and the platform/stage (16), wherein the sprinkler spray (18) is connected to the inlet pipe (19), wherein the spraying of water stops after a predetermined time;

Swiveling the platform (16) to an upright position by another 180° after the cleaning is done;

Disposing the waste from the system through the sewage exit pipe (20).

In another embodiment of the present invention, the method of cleaning the system and swiveling functions of the platform (16) can also be carried out manually i.e. independent of the automation (i.e. bypassing the sensors).

Advantages of the Present Invention

The size of the pet toilet system is customizable according to various needs of the pet owner.

The system facilitates single occupancy of the toilet at any given time.

The pet toilet system can be used both indoors and outdoors.

The pet toilet system is provided with a weather-proof enclosure.

The enclosure has transparent walls, to make it less intimidating for the pet and further enabling the owner to monitor the pet while using the toilet, thereby reducing the anxiety of both the pet and the owner.

The system is provided with self-locking door to prevent un-desirable intrusion of hostile animals.

The design and working of the system is hygienic, healthy and odor-free.

The system is fitted with CCTV to monitor the entry and exit of the pet animals.

The flat surface of the system makes it as close to the natural environment for the pet animals.

Removable top of the system's enclosure makes it easy for the pet's toilet training.

Safety locks of the system ensures pet safety.

The positive identification feature of the system controls entry of the pet and prevents unwanted intrusion.

The system is provided with a heater that heats water which enables to maintain warm temperature inside the system when used outdoors during winter.

The water used for circulation within the enclosure of the system to maintain warm temperature, is also used to clean and flush the toilet.

A separate mixer and reservoir fitment option in the system for the addition of dis-infectant enables hygienic and odor-free environment inside the system.

The ramp of the system can be replaced by steps.

The cleaning and flush water supply/outlet can be connected to direct connection to the relevant exit pipelines and in-case of the water supply it can be fitted to a pump or supply from a reservoir and storing it into a water tank inside the system.

The entry/exit flip door of the system can be replaced by a sliding door to save space.

The system can be constructed in various shapes according to the space availability especially indoors.

The system enables the pet animal to use the toilet without any human intervention.

Example 1

The pet toilet system comprises of a ramp (11), an outer sensor (12), an inner sensor (15), a door (14), a swiveling platform (16), sprinkler line and an inlet line (19) in the upper chamber (22). A control box (21) connected to the sensors (12, 15), platform (16), pipes etc., is fitted under the ramp (11). A lower chamber (23) comprises of a sewage tank (30) fitted with a sewage pipe (20). The pet toilet system may also consist of steps (25) instead of ramp (11) to enter the toilet system. A pet animal approaches the toilet system, and the outer sensor (12) (in front of the door) senses the pet and un-locks the door (14). The pet animal then flips the door (14) and enters and then crosses the inner sensor (15) (behind the door in the system) which then senses and locks the door (14) thus ensuring and preventing any other pet animal from entering the toilet system while the first pet animal is using the toilet. After the pet animal has excreted on the platform (16) of the system and approaches the exit, the inner sensor (15) senses the pet animal and un-locks the door (14). The pet animal flips the door (14) and exits. The outer sensor (12) then senses the dog exiting the toilet and locks the front door (14).

The automated cleaning process of the system is then carried out. The cleaning process entails the entire floor/platform (16) of the toilet swiveling by 180° (upside position) and at the same time the various water sprinklers (18) start spraying water to all the surfaces that can possibly be soiled including the platform (16) surface and walls of the system. Once a thorough washing is carried out for a predetermined amount of time, the platform (16) swivels back by 180° (upright position) and is locked in place and ready to be used. Outer sensor (12) is then activated to sense and allow the entry of the pet animal once again. While the cleaning of the system is in progress the sensors (12, 15) ensure that the door of the system is locked thus preventing the entry of the pet animal. The transparent upper walls of the enclosure of the system ensures that the pet animal can be observed while it is inside the system. The cleaning of the system and swivel functions of the platform (16) can also be carried out manually, independent of the automation (i.e., bypassing the sensors).

Example 2

The pet toilet system can be used as an outdoor unit, wherein the system comprises of a ramp (11) or steps (25), an outer sensor (12), an inner sensor (15), a door (14), a swiveling platform (16), sprinkler line and an inlet line (19) in the upper chamber (22). A control box (21) connected to the sensors (12, 15), platform (16), pipes etc., is fitted under the ramp (11). A lower chamber (23) comprises of a sewage tank (30) fitted with a sewage pipe (20). The system is further housed in an enclosure comprising of a pipeline (29) running around the housing. The enclosure is further provided with an over-head water tank (26), which serves to provide insulation from above during winter. The water tank (26) is further fitted with an inlet pipe (19) and a float valve (27) to automatically keep the water tank full and prevent overflow. The water tank has an embedded heater (32) to keep the water warm as required. The pipeline (29) which runs all around the housing in circles also serves as heating coils to keep the entire enclosure warm. The pipeline (29) is provided with a pump/turbine (30) to keep the water flowing throughout. The pipeline (29) is fitted with a thermostat (28) on the return line just before water re-enters the tank which in turn controls the heater (32) in the tank.

The pipeline running around the enclosure keeps the system warm, which enables the pet animal to use the toilet system outdoors even during winter. After the pet animal excretes on the platform (16) of the system, the automated cleaning process of the system is then carried out. wherein the entire floor/platform (16) of the toilet swivels by 180° (upside position) and at the same time the various water sprinklers (18) start spraying water to all the surfaces that can possibly be soiled including the platform (16) surface and walls of the system. Once a thorough washing is carried out for a predetermined amount of time, the platform (16) swivels back by another 180° (upright position) and is locked in place and ready to be used. The waste and debris from the cleaning is collected in the sewage tank (31) which is the expelled through the sewage line (20). The cleaning of the system and swivel functions of the platform (16) can also be carried out manually, independent of the automation (i.e., bypassing the sensors).

It will be apparent to a person skilled in the art that the above description is for illustrative purposes only and should not be considered as limiting. Various modifications, additions, alterations, and improvements without deviating from the scope of the invention may be made by a person skilled in the art.

I claim:

1. A semi portable, automated, enclosed toilet system for pet animals without human intervention, the system comprising:
    at least one outer sensor (12) operably connected to a lock (13) of a front flip door (14) which is hinged on top, wherein the outer sensor (12) senses the approach of a pet animal and energizes and deactivates the lock (13) of the front door (14) to open when the pet animal enters the system;
    at least one inner sensor (15) operably connected to the lock (13) of the front door (14), wherein the inner sensor (15) senses the approach and entry of the pet animal through the front door (14) and energizes and activates the lock (13) of the front door (14);
    a swiveling platform (16) that is used by the pet animal to defecate, wherein the swiveling platform (16) houses a swiveling motor (17);
    a plurality of sprinkler lines (18) to spray water, wherein the sprinkler lines (18) are operably connected to a water tank (26) through an inlet pipe (19);
    at least one control box (21) fitted under a ramp (11) wherein the control box (21) is operably connected to the sensors (12, 15), the swiveling motor (17) of the swiveling platform (16), the sprinkler lines (18);
    an upper chamber (22) which houses the sensors (12, 15), the front door (14), the swiveling platform (16), the sprinkler lines (18), and the inlet pipe (19) that provides water supply;
    a lower chamber (23) which houses a sewage tank (31) provided with a sewage pipe (20), wherein the sewage pipe (20) runs on at least one side of the lower chamber (23),
    wherein the system is housed in an enclosure, wherein upper parts of the enclosure are transparent, and
    wherein the enclosure includes a pipeline (29) running all around the enclosure in circles which is connected to the water tank (26) in which a water heater (32) is embedded, and heated water from the water tank (26) circulates all along walls of the enclosure through the pipeline (29) to keep the system warm.

2. The pet toilet system as claimed in claim 1, wherein the pet animal enters and exits the toilet system using the ramp (11);
    the outer sensor (12) senses the approach of the pet animal and deactivates the lock (13) of the front door (14) to enable the opening of the door (14), wherein the pet animal flips the front door (14) and enters the system;
    the inner sensor (15) senses the entry of the pet animal and activates the lock (13) of the front door (14), wherein the front door (14) is locked after the pet animal enters the system;
    the pet animal uses the swiveling platform (16) to defecate and exits the swiveling platform (16);

the inner sensor (15) senses the exit of the pet animal and deactivates the lock (13) of the front door (14) through which the pet animal exits the system; and the outer sensor (12) senses the exit of the pet animal through the front door (14) and activates the lock (13) of the front door (14), wherein the system is locked again after the pet animal exits.

3. The pet toilet system as claimed in claim 1, wherein the swiveling platform (16) comprises of multiple sections (16a, 16b, 16c) and the rotation of the swiveling platform (16) is facilitated by means of at least a spindle (24) which provides the axis of rotation for the swiveling platform (16).

4. The pet toilet system as claimed in claim 3, wherein the multiple sections (16a, 16b, 16c) of the swiveling platform (16) enables a height adjustment of the swiveling platform (16).

5. The pet toilet system as claimed in claim 1, wherein a cleaning water supply is connected to at least a pump (30) for water supply from a reservoir which is emptied into the water tank (26) and the sewage pipe (20) is directly connected to exit pipelines to expel waste from the system.

6. The pet toilet system as claimed in claim 1, wherein the water tank (26) is fitted on top of the system when used outdoors, wherein the over-head water tank (26) containing the heated water provides insulation from above to the system during winter.

7. The pet toilet system as claimed in claim 1, wherein a pipeline (29) in the enclosure is fitted with a pump or a turbine (30) to keep the water flowing in the pipeline (29).

8. The pet toilet system as claimed in claim 1, wherein a pipeline (29) is fitted with a thermostat (28) which senses a water temperature and activates a heater (32) in the water tank (26) if the water temperature is below a predetermined value.

9. The pet toilet system as claimed in claim 1, wherein the front door (14) provided with self-locking feature enabled by the sensors (12, 15) ensures that the toilet system is used only by a single pet animal.

10. The pet toilet system as claimed in claim 1, wherein the toilet system is provided with steps (25) to walk on and enter or exit the toilet system.

11. The pet toilet system as claimed in claim 1, wherein the sensors include one or more of temperature sensor, proximity sensor, light sensor, pressure sensor, and smoke sensor.

12. The pet toilet system as claimed in claim 1, wherein the sprinkler lines (18) spraying water on the swiveling platform (16) and walls of the enclosure are customized to spray for a predetermined time.

13. The pet toilet system as claimed in claim 1, wherein a top part of the enclosure of the system is removably attached to the enclosure.

14. The pet toilet system as claimed in claim 1, wherein the system is provided with a CCTV (closed-circuit television) surveillance feature for monitoring activities of the pet animal inside the system.

15. The pet toilet system as claimed in claim 1, wherein the pet toilet system is provided with a separate mixer and reservoir fitment option for addition of dis-infectant to keep the toilet system clean and hygiene.

16. The pet toilet system as claimed in claim 1, wherein the pet toilet system is provided with an identification mechanism such as an RFID reader that identifies and controls the entry of the pet animal which also is provided with a compatible RFID tag on its collar.

17. A method of cleaning the pet toilet system of claim 1, comprising the steps of:

when the pet animal enters the system, uses the platform (16) to defecate, and exits the system, locking the pet toilet system through the outdoor sensor (12) which activates the lock (13) of the front door (14) once the pet animal exits, wherein the outdoor sensor (12) senses the exit of the pet animal;

swiveling the platform (16) in the upper chamber (22) by 180° to an upside-down position by means of the control box (21) operably connected to the sensors (12, 15) and the swiveling motor (17) of the platform (16) which dumps waste/debris that is to be flushed out;

activating the sprinkler lines (18) which spray water on the walls of the enclosure and the platform (16), wherein the sprinkler lines (18) are connected to the water tank (26) through the inlet pipe (19), wherein the spraying of water stops after a predetermined time;

swiveling the platform (16) by another 180° to an upright position after cleaning is done;

disposing the waste/debris from the system through the sewage pipe (20), wherein the outer sensor (12) ensures that the front door (14) remains locked during the cleaning.

18. The method of cleaning the pet toilet system as claimed in claim 17, wherein cleaning the system and swiveling the platform (16) are carried out manually, bypassing the sensors (12, 15).

* * * * *